(12) United States Patent
Warade et al.

(10) Patent No.: US 10,432,420 B2
(45) Date of Patent: Oct. 1, 2019

(54) METHODS, DEVICES, AND COMPUTER-READABLE MEDIA FOR PREVENTING BROADCAST LOOPS DURING A SITE MERGE

(71) Applicant: Cisco Technology, Inc., San Jose, CA (US)

(72) Inventors: Priyanka Warade, Redwood City, CA (US); Gaurav Badoni, Milpitas, CA (US); Suresh Pasupula, San Jose, CA (US); Senthil Kenchiah, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 15/662,556

(22) Filed: Jul. 28, 2017

(65) Prior Publication Data
US 2019/0036729 A1    Jan. 31, 2019

(51) Int. Cl.
| | | |
|---|---|---|
| *H04L 12/28* | (2006.01) | |
| *H04L 12/54* | (2013.01) | |
| *H04L 12/46* | (2006.01) | |
| *H04L 12/705* | (2013.01) | |
| *H04L 12/721* | (2013.01) | |

(52) U.S. Cl.
CPC ........ *H04L 12/2854* (2013.01); *H04L 12/462* (2013.01); *H04L 12/4641* (2013.01); *H04L 12/5691* (2013.01); *H04L 45/18* (2013.01); *H04L 45/66* (2013.01)

(58) Field of Classification Search
None
See application file for complete search history.

(56) References Cited

U.S. PATENT DOCUMENTS

| | | | | |
|---|---|---|---|---|
| 7,606,939 B1* | 10/2009 | Finn | ..................... | H04L 12/4645 709/246 |
| 8,451,715 B1* | 5/2013 | Doshi | ..................... | H04L 45/28 370/218 |
| 2012/0113871 A1 | 5/2012 | Bulusu | | |
| 2013/0254356 A1* | 9/2013 | Eastlake, III | ........... | H04L 45/74 709/220 |

(Continued)

OTHER PUBLICATIONS

Sajassi, A. (Ed.) et al., "RFC 7432—BGP MPLS-Based Ethernet VPN," Internet Engineering Task Force (IETF), Feb. 2015.

*Primary Examiner* — Alpus Hsu
*Assistant Examiner* — Camquyen Thai
(74) *Attorney, Agent, or Firm* — Meunier Carlin & Curfman LLC (57) ABSTRACT

Methods, devices, and computer-readable medium for preventing broadcast looping during a site merge are described herein. An example method can include detecting a site merge between a plurality of layer 2 (L2) networks using a spanning tree protocol (STP), blocking a data traffic port connecting the L2 networks in response to detecting the site merge, and performing an STP-Ethernet virtual private network (EVPN) handshake. The STP-EVPN handshake can include changing a root bridge in one of the L2 networks. Thereafter, the method can include unblocking the data traffic port connecting the L2 networks. In other words, the data traffic port connecting the L2 networks can be unblocked after changing the root bridge in the one of the L2 networks.

15 Claims, 8 Drawing Sheets

(56) References Cited

U.S. PATENT DOCUMENTS

| | | | |
|---|---|---|---|
| 2015/0049645 A1* | 2/2015 | Zhou | H04L 12/4641 370/256 |
| 2016/0127224 A1* | 5/2016 | Wang | H04L 12/462 370/256 |
| 2017/0288948 A1* | 10/2017 | Singh | H04L 41/0659 |
| 2017/0288970 A1* | 10/2017 | Lin | H04L 41/12 |
| 2018/0006995 A1* | 1/2018 | Bickhart | H04L 12/4625 |

* cited by examiner

METHODS, DEVICES, AND COMPUTER-READABLE MEDIA FOR PREVENTING BROADCAST LOOPS DURING A SITE MERGE

BACKGROUND

Spanning tree protocol (STP) is a network protocol for creating logical loop-free Ethernet network topology. STP is well known in the art and can run on bridges and/or switches in a layer 2 (L2) network. In a multi-homed network, hosts are connected via a bridged local area network (LAN) between Ethernet virtual private network (EVPN) capable top-of-rack (TOR) devices and access switches. In some scenarios, a user (e.g., administrator, operator, etc.) may accidentally (or intentionally) merge a plurality of EVPN multi-homed networks. In conventional implementations, this type of site merge is undesirable because of the resulting broadcast loops or broadcast storms.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for preventing broadcast looping during a site merge, it will become evident to those skilled in the art that the implementations are not limited thereto.

Overview

Methods, devices, and computer-readable medium for preventing broadcast looping during a site merge are described herein. The technique described herein for preventing broadcast looping integrates STP convergence with the single-active designated forwarder (DF) election process in response to detecting a site merge between a plurality of L2 networks. This technique ensures that only a single-active forwarder is present for the merged site before STP opens up the L2 network, thereby preventing broadcast loops or broadcast storms. The technique described herein includes an STP-EVPN handshake with communication between local STP and virtual extensible LAN (VxLAN) control plane only. The STP-EVPN handshake ensures that only a single TOR device within the merged site can be the active forwarder for a given Ethernet-Segment thereby eliminating loops. The solution prevents blocking of links within the merged site so that hosts can directly talk to each other without going via VxLAN.

EXAMPLE EMBODIMENTS

Figure 1:
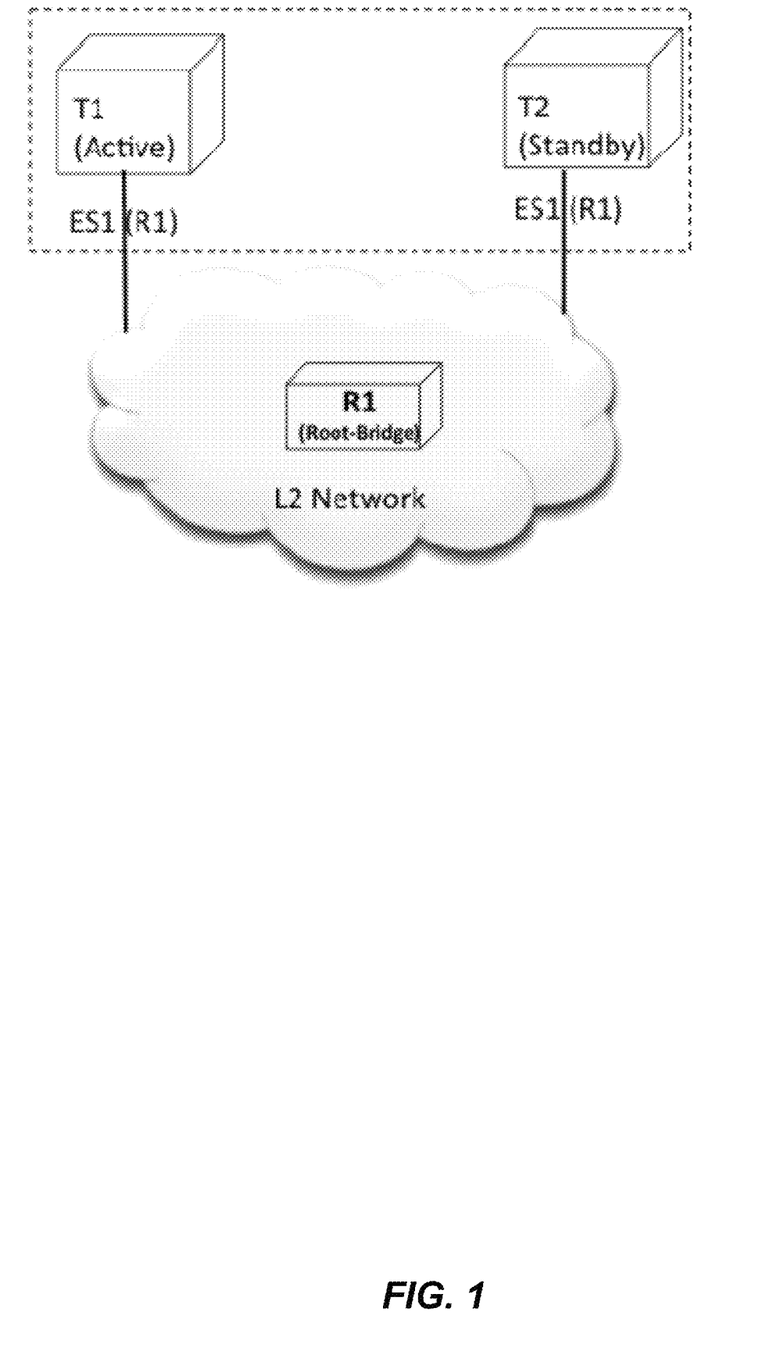
FIG. 1 illustrates an example Ethernet virtual private network (EVPN) multi-homed network according to an implementation described herein.

Referring now to FIG. 1, an example EVPN multi-homed network is shown. An example EVPN implementation is described in Sajassi, A. (Ed.) et al., "RFC 7432-BGP MPLS-Based Ethernet VPN," Internet Engineering Task Force (IETF)." The EVPN multi-homed network can include hosts, switches, routers, bridges, gateways, and/or other computing devices. The devices in the EVPN multi-homed network can be communicatively coupled to each other through one or more communication links. This disclosure contemplates the communication links can be any suitable communication link. For example, a communication link can be implemented by any medium that facilitates data exchange between the network devices including, but not limited to, wired, wireless and optical links. Example communication links include, but are not limited to, a LAN, a WAN, a MAN, Ethernet, the Internet, or any other wired or wireless link such as WiFi, WiMax, 3G or 4G. In a multi-homed network, hosts are connected via a bridged LAN between EVPN capable TOR devices and access switches. The multi-homed devices are physically connected to a plurality of communication links on the same or different networks. In some implementations, a device can have a plurality of physical interfaces to the same network. In other implementations, a device can have a plurality of physical interfaces to different networks. Multi-homing can assist in providing a desired level of performance and/or reliability, for example.

In FIG. 1, the EVPN multi-homed network includes a pair of EVPN capable TOR devices T1, T2. TOR devices T1, T2 are multi-homed to the L2 network. The L2 network (e.g., a LAN) in FIG. 1 is managed using the spanning tree protocol (STP). STP is a network protocol for creating logical loop-free Ethernet network topology and is well known in the art. STP can run on bridges and/or switches in the L2 network such as TOR devices T1, T2 and/or switch R1. In FIG. 1, switch R1 is the root bridge for the L2 network. The root bridge is at the top of the spanning tree, i.e., it has the highest priority. The TOR devices T1, T2 are configured to operate in a single-active mode, where only one TOR device encapsulates/decapsulates traffic for a given Ethernet segment. As shown in FIG. 1, TOR device T1 is the active device and TOR device T2 is the standby device. Additionally, TOR devices T1, T2 can derive their Ethernet segment indicators (ESI) (i.e., ES1 for both TOR devices T1, T2 in FIG. 1) from the root bridge (i.e., switch R1). It should be understood that the EVPN multi-homed network shown in FIG. 1 is provided only as an example. This disclosure contemplates that the systems, devices, and methods for preventing broadcast looping during a site merge described herein can be implemented in an EVPN multi-homed network different than the one described with regard to FIG. 1, e.g., an EVPN multi-homed network including different numbers and/or types of network devices, computing devices, networks, and/or communication links.

Figure 2:
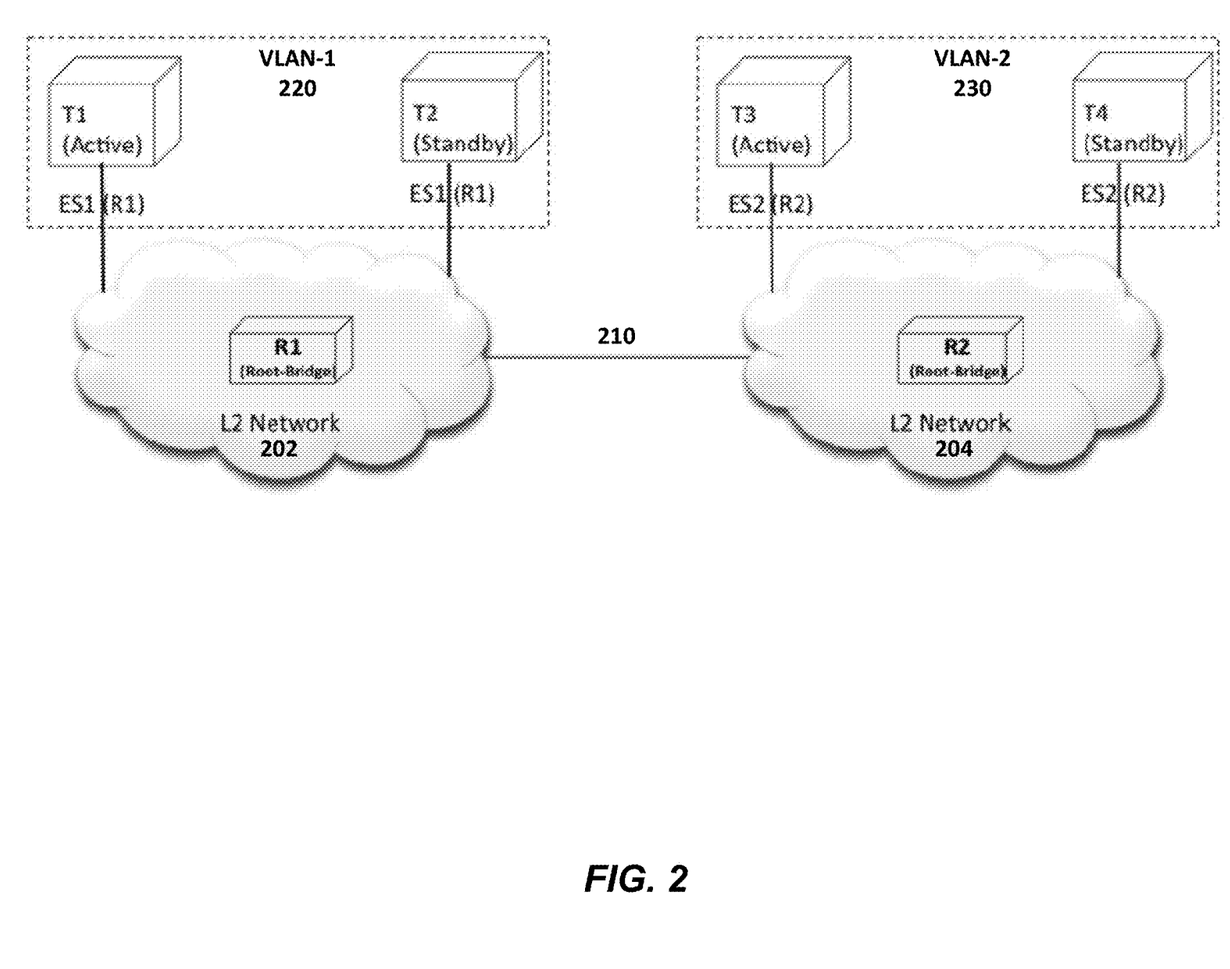
FIG. 2 illustrates an accidental site merge of two EVPN multi-homed networks according to an implementation described herein.

Referring now to FIG. 2, an accidental site merge of two EVPN multi-homed networks is shown. In FIG. 2, a first EVPN multi-homed network 202 includes TOR devices T1, T2 and switch R1, which is the root bridge for the first EVPN multi-homed network 202. TOR devices T1, T2 and switch R1 are described above with regard to FIG. 1. A second EVPN multi-homed network 204 includes TOR devices T3, T4 and switch R2, which is the root bridge for the second EVPN multi-homed network 204. TOR devices T3, T4 are configured to operate in a single-active mode. TOR devices T3, T4 are EVPN capable TOR devices. As shown in FIG. 2, TOR device T3 is the active device and TOR device T4 is the standby device. Additionally, TOR devices T3, T4 can derive their Ethernet segment indicators (ESI) (i.e., ES2 for TOR devices T3, T4 in FIG. 2) from the root bridge (i.e., switch R2).

Figure 3:
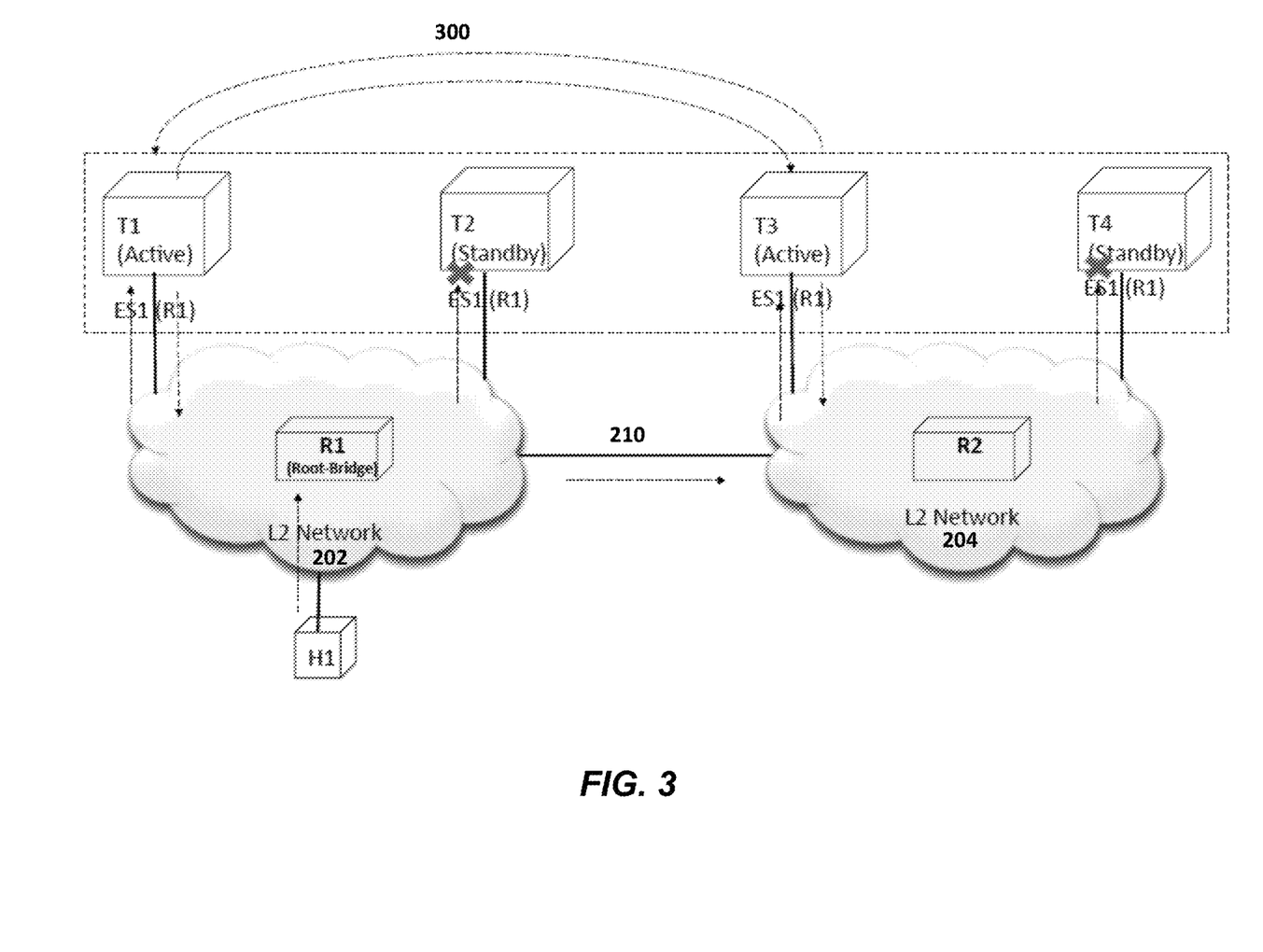
FIG. 3 illustrates the resulting merged EVPN multi-homed network following the accidental site merge of FIG. 2.

As shown in FIG. 2, a user (e.g., operator, administrator, etc.) can link the first EVPN multi-homed network 202 and the second EVPN multi-homed network 204, which leads to a site merge. This disclosure contemplates that the first EVPN multi-homed network 202 and the second EVPN multi-homed network 204 can be connected by a communication link 210, e.g., an Ethernet cable. In response, STP places the communication link 210 to forwarding and the first EVPN multi-homed network 202 and the second EVPN multi-homed network 204 are merged. As a result, TOR devices T1 and T3 remain active forwarders for VLAN-1 220 and VLAN-2 230, respectively. This creates loops in the network, which are shown in FIG. 3. It should be understood that both TOR devices T1 and T3 will remain active forwarders until EVPN DF re-election occurs. Although the loop is transient (i.e., DF re-election will correct), it should be understood that the transient loop can cause significant issues in the network. For example, in some cases, the loop can significantly burden the TOR devices (e.g., TOR device T1 or TOR device T2) due to the flood of data, which can extend the time for completing DF re-election (or even prevent it from completing altogether). Additionally, unlike Layer 3 with time-to-live (TTL) or hop limitations, there is no mechanism in L2 to discard data and alleviate issues caused by looping.

Referring now to FIG. 3, the resulting merged EVPN multi-homed network is shown. The L2 networks (i.e., first and second EVPN multi-homed networks 202, 204), TOR devices T1, T2, T3, T4, and switches R1, R2 are similar to those described above with regard to FIG. 2. As discussed above with regard to FIG. 2, the site merge occurred when the communication link 210 connected the first EVPN multi-homed network 202 and the second EVPN multi-homed network 204 and STP placed the communication link 210 to forwarding. Since TOR devices T1 and T3 remain active forwarders, loops 300 are created in the merged network. As shown in FIG. 3, the standby TOR devices T2, T4 drop broadcast traffic (shown by "X"s), while both active TOR devices T1, T3 forward broadcast traffic, which creates loops or storms of broadcast traffic. For example, consider the case where host H1 sends broadcast traffic. Both TOR devices T1 and T3 forward the traffic from/towards the merged site, which leads to a broadcast storm and forwarding loops as shown in FIG. 3.

Figure 4:
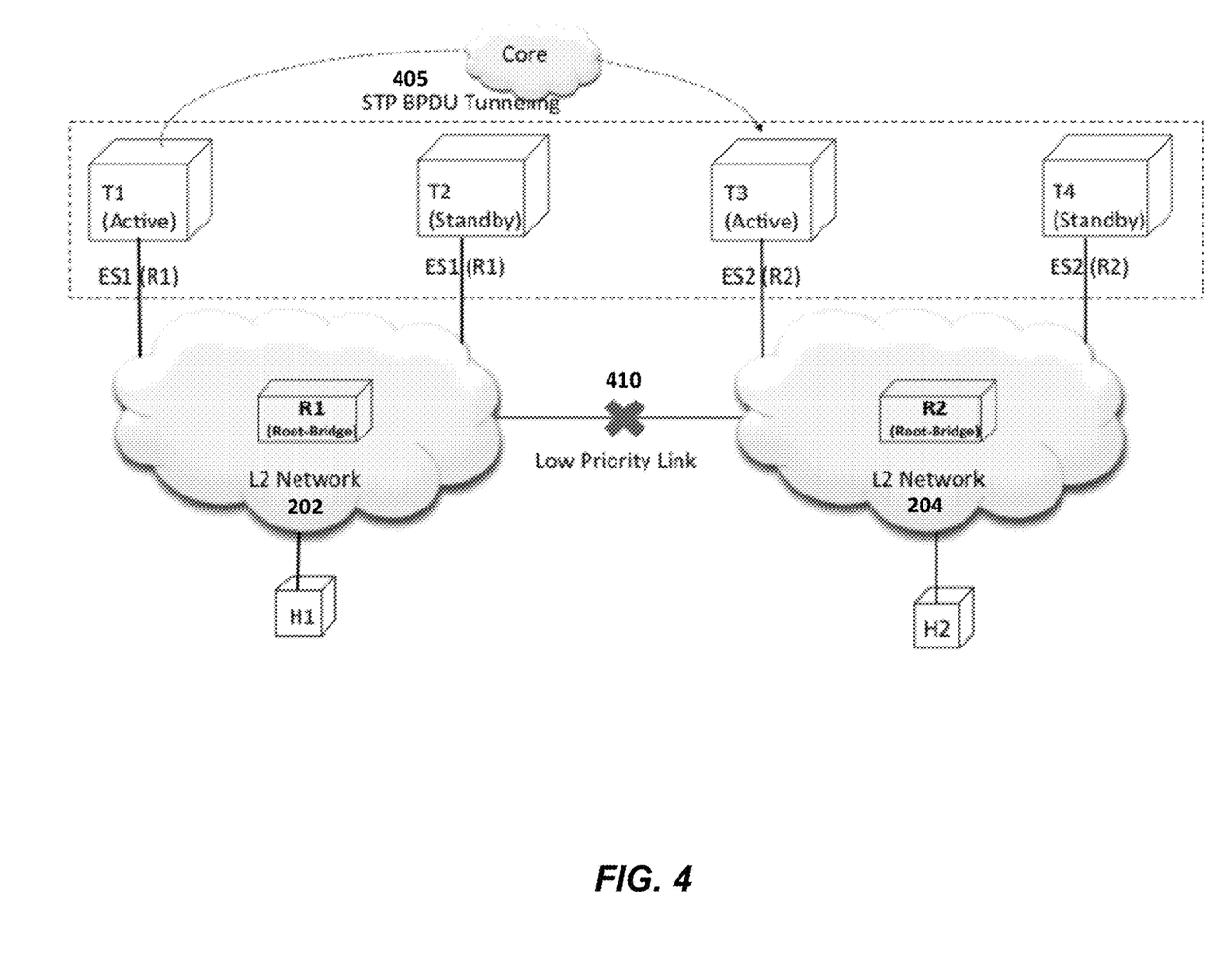
FIG. 4 illustrates two solutions to prevent broadcast looping.

There are two known solutions for preventing broadcast looping. As described below, however, neither known solution results in a true site merge. Referring now to FIG. 4, two solutions to prevent broadcast looping are shown. The L2 networks (i.e., the first and second EVPN multi-homed networks 202, 204), TOR devices T1, T2, T3, T4, and switches R1, R2 are similar to those described above with regard to FIGS. 2 and 3. In FIG. 4, a site merge is attempted when communication link 410 is connected between the first and second EVPN multi-homed networks 202, 204. One solution to prevent broadcast looping involves tunneling STP packets 405 across all EVPN sites. Tunneling is known in the art and involves encapsulation at a transmitting device and decapsulation at a receiving device. This disclosure contemplates using bridge protocol data units (BDPUs), which are known in the art, to tunnel STP packets between switches. These packets traverse the network over the VxLAN. It should be understood that this solution extends the L2 domain across the entire EVPN network, which is not a scalable solution. Another solution to prevent broadcast looping is to deploy L2 gateway-spanning tree protocol (L2G-STP) on the TOR devices (e.g., TOR devices T1, T2, T3, T4 in FIG. 4) in the network. L2G-STP is described in U.S. 2012/0113871 to Bulusu, published May 10, 2012 and entitled "System and Method for Providing a Loop Free Topology in a Network Environment." Using L2G-STP, the TOR devices appear to be the same virtual root. As noted above, neither tunneling STP packets nor deploying L2G-STP results in a true site merge, however. When communication link 410 connects the two sites (i.e., the first and second EVPN multi-homed networks 202, 204), L2G-STP blocks communication link 410 to prevent the L2 loop. As a result, host H1 and host H2 cannot communicate directly with one another, and the true site merge does not occur.

Figure 5A:
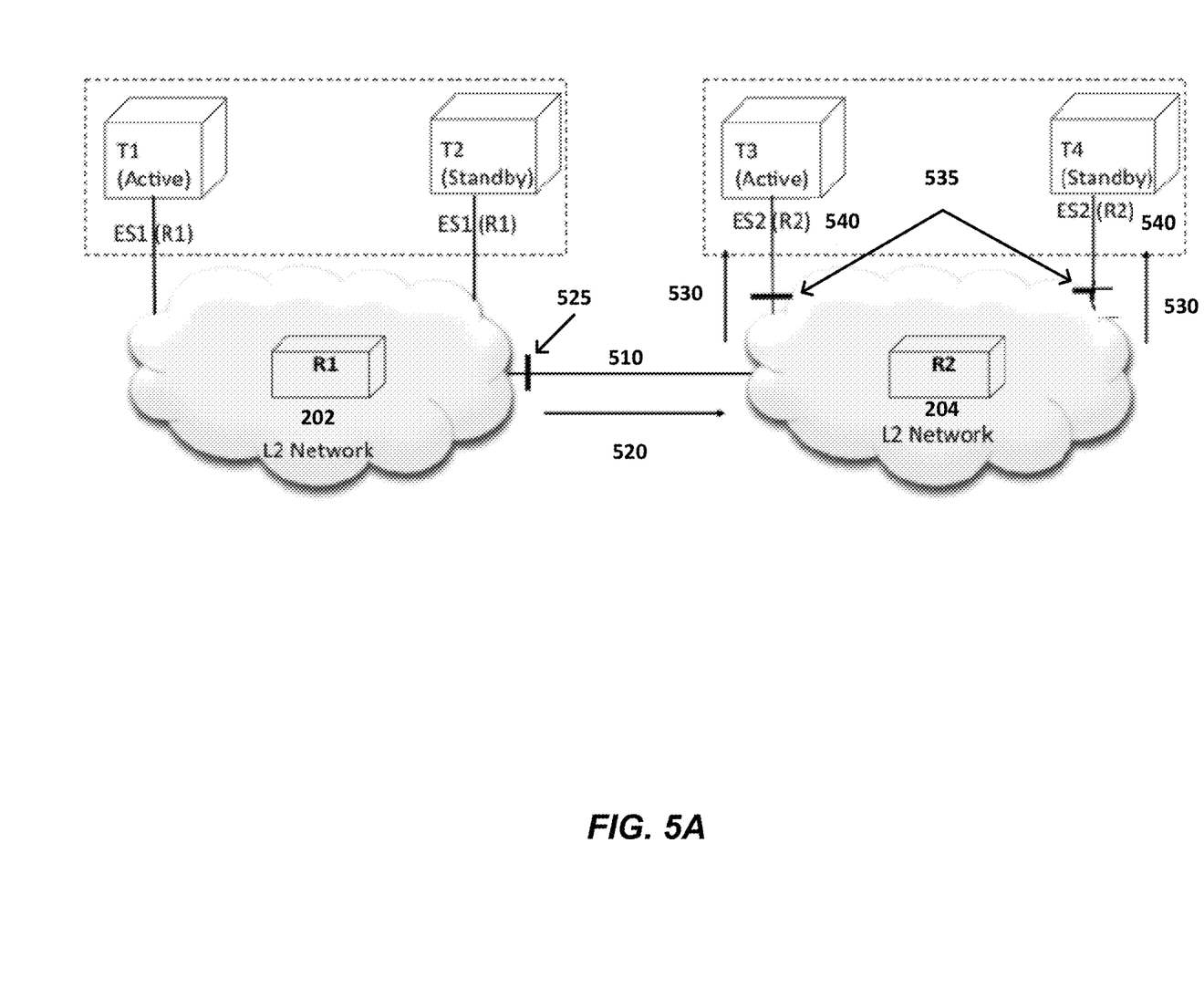
FIG. 5A illustrates a site merge of two EVPN multi-homed networks according to an implementation described herein.

Referring now to FIG. 5A, a site merge of two EVPN multi-homed networks is shown. In FIG. 5A, a technique for preventing broadcast looping is described. The technique integrates STP convergence with the single-active DF election process in response to detecting a site merge between a plurality of L2 networks (e.g., the first and second EVPN multi-homed networks 202, 204 in FIG. 5A). Similar to FIGS. 2-4, the first EVPN multi-homed network 202 includes TOR devices T1, T2 and switch R1, which is the root bridge for the first EVPN multi-homed network 202. TOR devices T1, T2 are configured to operate in a single-active mode. As shown in FIG. 5A, TOR device T1 is the active device and TOR device T2 is the standby device. Additionally, TOR devices T1, T2 can derive their Ethernet segment indicators (ESI) (i.e., ES1 for both TOR devices T1, T2 in FIG. 5A) from the root bridge (i.e., switch R1). The second EVPN multi-homed network 204 includes TOR devices T3, T4 and switch R2, which is the root bridge for the second EVPN multi-homed network 204. TOR devices T3, T4 are configured to operate in a single-active mode. As shown in FIG. 5A, TOR device T3 is the active device and TOR device T4 is the standby device. Additionally, TOR devices T3, T4 can derive their Ethernet segment indicators (ESI) (i.e., ES2 for TOR devices T3, T4 in FIG. 5A) from the root bridge (i.e., switch R2). Additionally, as described above, it should be understood that TOR devices T1, T2, T3, T4 are VPN devices (e.g., EVPN capable devices).

As shown in FIG. 5A, the user (e.g., operator, administrator, etc.) can link the first EVPN multi-homed network 202 and the second EVPN multi-homed network 204 to merge the L2 networks. This disclosure contemplates that the first EVPN multi-homed network 202 and the second EVPN multi-homed network 204 can be connected by a communication link 510, e.g., an Ethernet cable. At 520, the site merge can be detected using STP and a new spanning tree can be calculated. For example, when the site merge occurs (e.g., in response to connecting communication link 510 between the L2 networks), a new root bridge will be detected on either one of L2 networks (i.e., one of the first or second EVPN multi-homed networks 202, 204). According to STP, devices (e.g., bridges such as switch R1 and switch R2 in FIG. 5A) use bridge protocol data units (BDPUs) to exchange information about the network. A root bridge for the spanning tree can be selected by comparing bridge priority information (e.g., bridge identification/priority and/or media access control (MAC) address), which is exchanged by switches R1 and R2. In FIG. 5A, switch R1 is assumed to have a higher priority as compared to switch R2. It should be understood that that the particular device with priority is provided only as an example. In other words, switches R1, R2 can determine which has priority using the information exchanged in the BDPUs. In FIG. 5A, since switch R1 has priority, a change in root bridge for the second EVPN multi-homed network 204 can be detected. In response to the change request, the port towards switch R1 can be blocked, which is shown with arrow 525 in FIG. 5A. Accordingly, a data traffic port connecting the L2 networks can be blocked in response to detecting the site merge.

At 530, an STP-EVPN handshake can be performed. In this way, STP (e.g., STP module running on a TOR device) can inform EVPN (e.g., VPN module running on a TOR device) to trigger a single-active DF re-election for the merged site, and EVPN can acknowledge completion of the change of the root bridge. The STP-EVPN handshake can be performed by exchanging STP messages (e.g., BDPUs) with the VPN devices (e.g., TOR devices T3, T4 in FIG. 5A). Additionally, the STP-EVPN handshake can be performed before unblocking the data traffic port connecting the L2 networks (e.g., port shown with arrow 525 in FIG. 5A), which merges the site. This process will prevent broadcast loops or broadcast storms from occurring in the merged site. In particular, after giving up its root bridge role, switch R2 can propagate the root bridge change request to TOR devices T3, T4 and also block ports connected to TOR devices T3, T4, which are shown by arrow 535 in FIG. 5A. In other words, the VPN devices can be notified of the request to change the root bridge. Switch R2 can then send acknowledgement to switch R1, and both switches R1, R2 can put their ports in the forwarding state. Switch R1 therefore becomes root bridge for both L2 networks (i.e., the first and second EVPN multi-homed networks 202, 204).

Then, at 540, a single-active DF re-election from the VPN devices (e.g., TOR devices T1, T2, T3, T4 in FIG. 5A) can occur. Border gateway protocol (BGP) network layer reachability information (NLRI) can be used to elect a single-active DF. For example, TOR devices T3, T4 can receive the request to change the root bridge from switch R2 and can acknowledge the same. In response, TOR devices T3, T4 can update the new root bridge (i.e., switch R1 in FIG. 5A). Additionally, TOR devices T3, T4 can give up their respective DF roles (e.g., TOR device T3 active, TOR device T4 standby in FIG. 5A) and automatically derive new ESI from the new root bridge—switch R1, ESI for TOR devices T1, T2. Both TOR devices T3, T4 can discover TOR devices T1, T2 through ES-Route, which will re-initiate the DF election and ensure that only one TOR device is the DF for a given ESI. Upon completion, EVPN (e.g., VPN module running on a TOR device) can notify STP (e.g., STP module running on a TOR device), and switch R1 and TOR devices T3, T4 can unblock their respective ports (e.g., ports shown by arrows 525 and 535 in FIG. 5A) to complete the site merge.

Figure 5B:
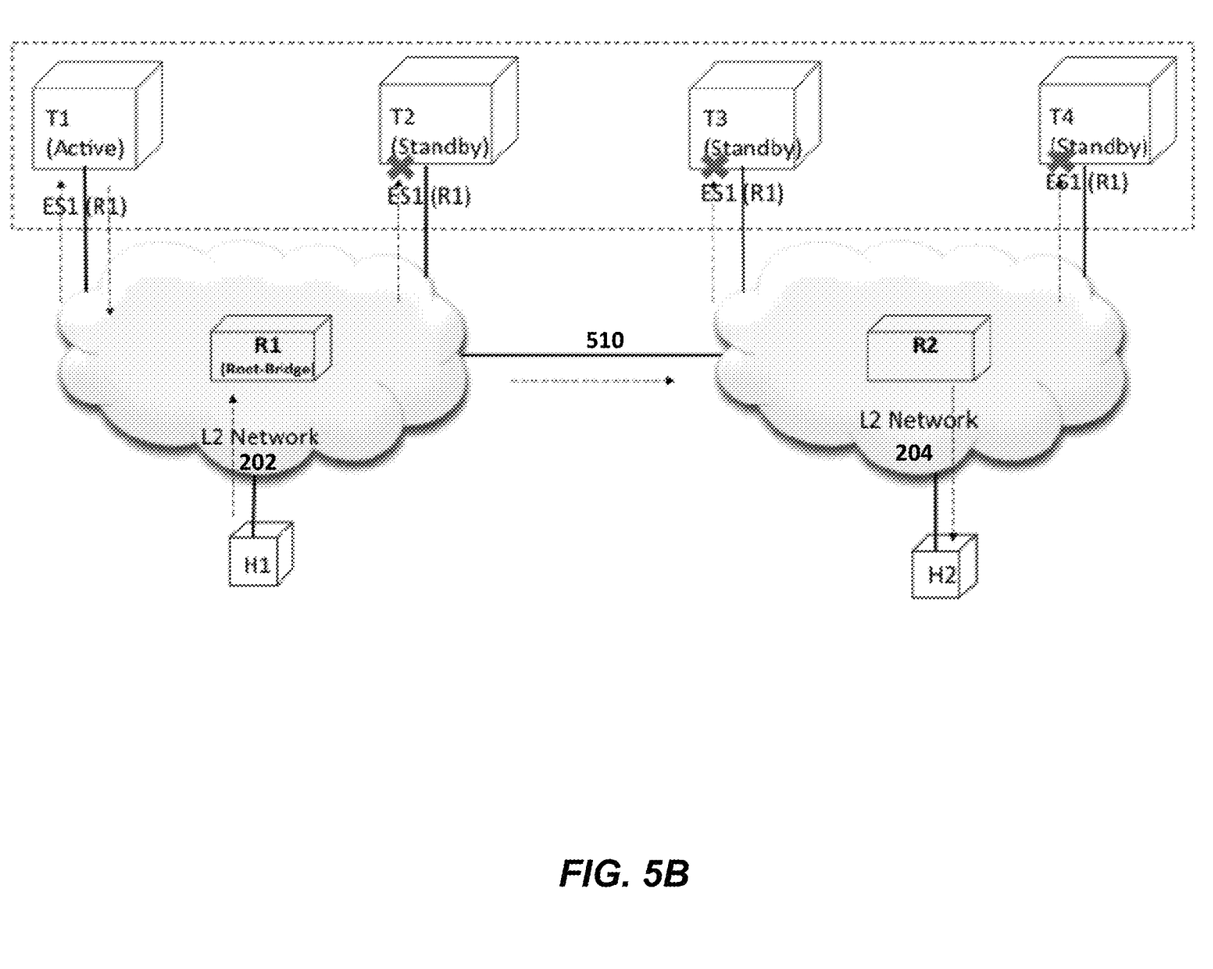
FIG. 5B illustrates the resulting merged EVPN multi-homed network following the site merge of FIG. 5A.

Referring now to FIG. 5B, the resulting merged site is shown. As a result of performing the STP-EVPN handshake, there is only a single-active DF (i.e., TOR device T1 in FIG. 5B) in the merged site, which eliminates any possibility of a loop. In FIG. 5B, the merged site (i.e., both first and second EVPN multi-homed networks 202, 204) includes TOR devices T1, T2, T3, T4 (e.g., VPN devices), switch R1, which is the root bridge for the merged site, and switch R2. TOR devices T1, T2, T3, T4 are configured to operate in a single-active mode. As shown in FIG. 5B, TOR device T1 is the active device and TOR devices T2, T3, T4 are the standby devices. Additionally, TOR devices T1, T2, T3, T4 can derive their Ethernet segment indicators (ESI) (i.e., ES1 for all TOR devices T1, T2, T3, T4 in FIG. 5B) from the root bridge (i.e., switch R1). As described above, the ordering of events in the STP-EVPN handshake ensures that broadcast traffic generated by host H1 will be dropped at all TOR devices (e.g., TOR devices T2, T3, T4 in FIG. 5B and shown by "X"s) except on TOR device T1. This prevents broadcast loops or broadcast storms from occurring in the merged site. Additionally, hosts H1 and H2 can communicate directly within the merged site, which is in contrast to the scenario described with respect to FIG. 4.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
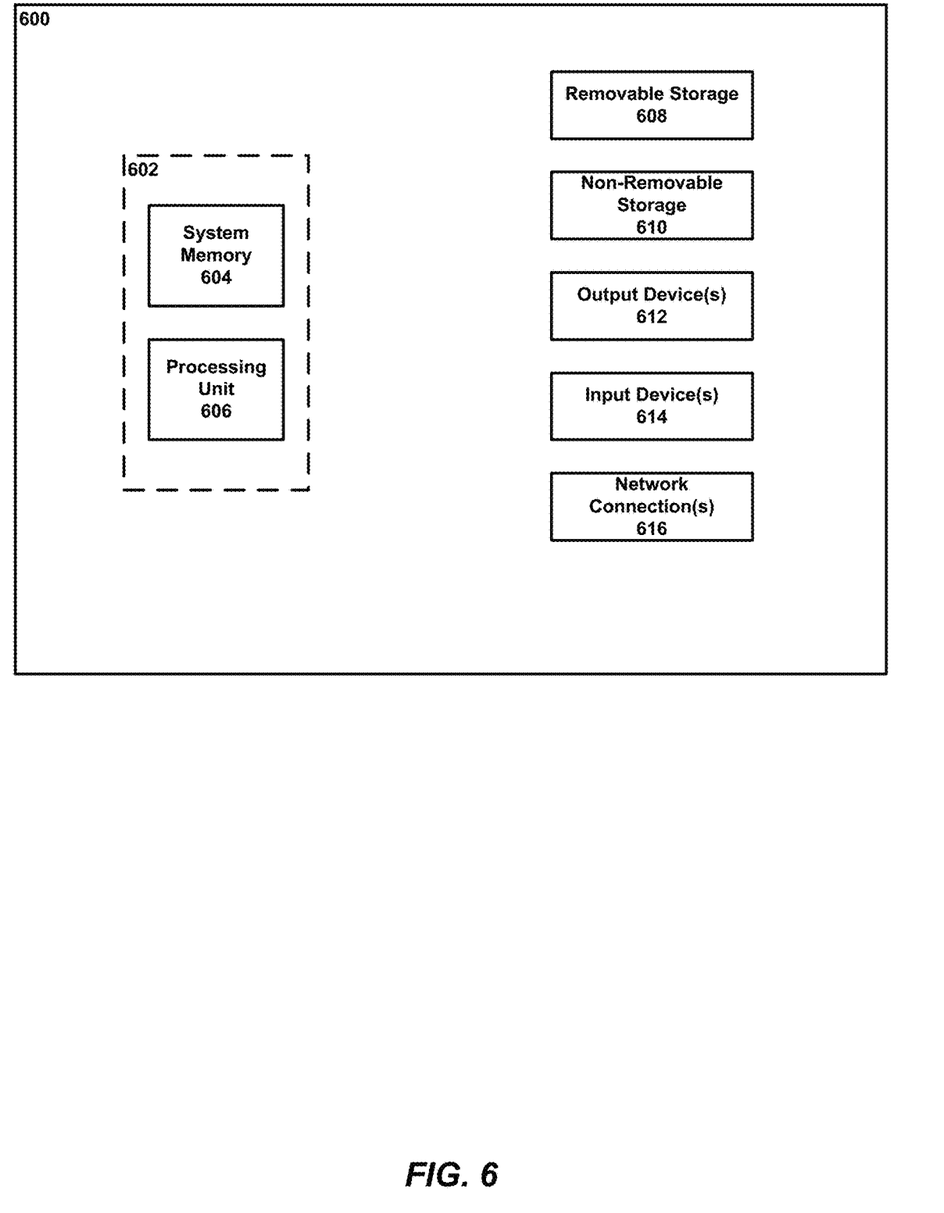
FIG. 6 illustrates an example computing device upon which embodiments of the invention may be implemented.

Referring to FIG. 6, an example computing device 600 upon which embodiments of the invention may be implemented is illustrated. For example, the TOR devices, switches, or other network devices described above can include a computing device 600. It should be understood that the example computing device 600 is only one example of a suitable computing environment upon which embodiments of the invention may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 7:
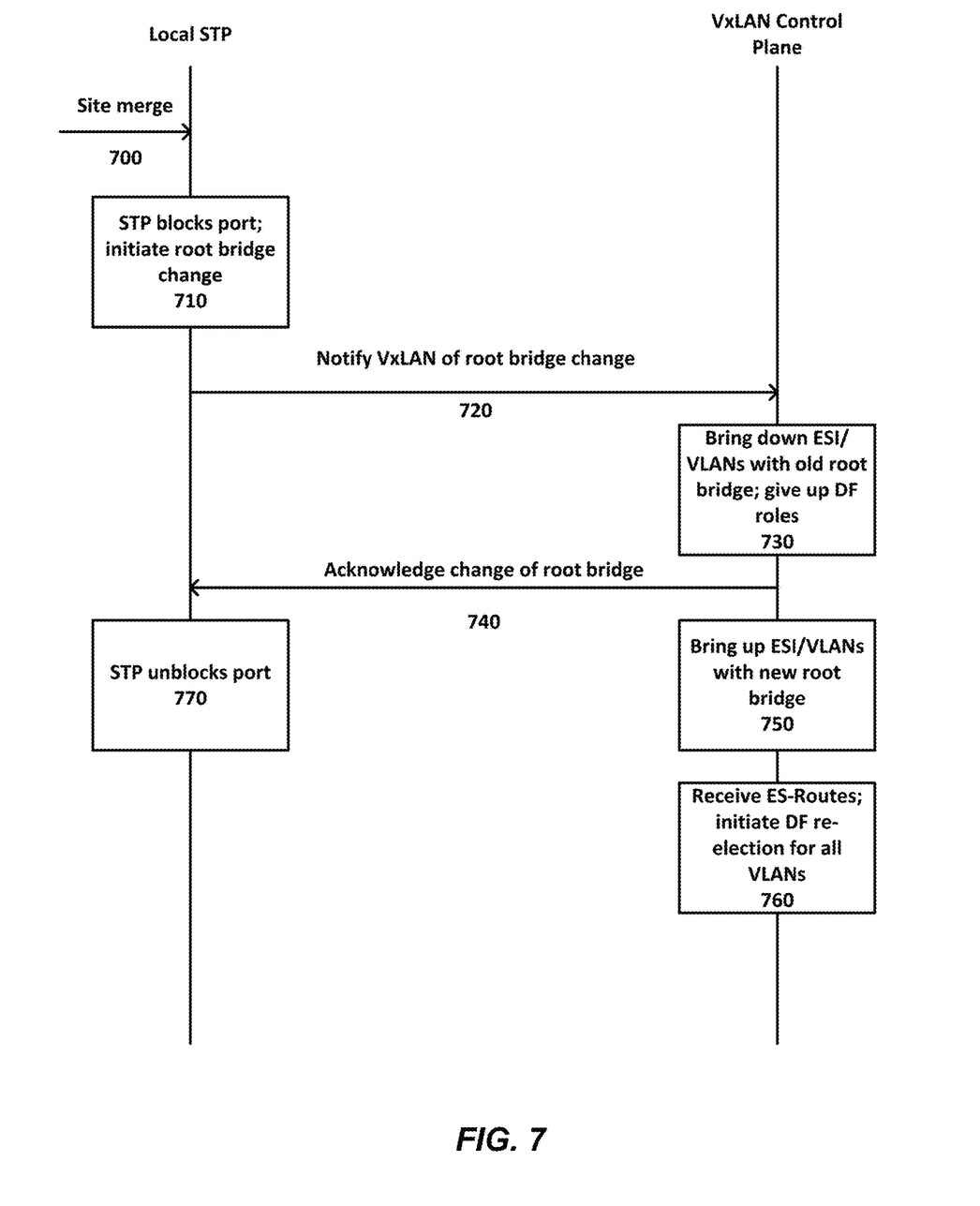
FIG. 7 is a flow diagram illustrating communication flows for preventing broadcast looping within the environment of FIG. 5A.

Referring now to FIG. 7, a flow diagram illustrating communication flows for preventing broadcast looping within the environment of FIG. 5A is shown. The communication flows for the STP-EVPN handshake (e.g., steps 720 and 740 below) are between local STP and VxLAN control plane only. In other words, the STP-EVNP handshake is carried out by the local STP and VPN modules. Thus, no changes are required on other network devices (e.g., switches, etc.) in the network for the STP-EVPN handshake. At 700, a site merge between a plurality of L2 networks (e.g., the first EVPN multi-homed network 202 and the second EVPN multi-homed network 204 in FIG. 5A) is detected. As described above, using STP, a site merge can be detected by a change in root bridge for one of the L2 networks (e.g., the second EVPN multi-homed network 204 in FIG. 5A). This occurs because one of the switches (e.g., switch R1 in FIG. 5A) has priority over the other switches and will become root bridge for the merged site. At 710, in response to the root bridge change request, STP blocks the port towards the new root bridge (e.g., port shown by arrow 525 in FIG. 5A). This prevents data traffic from flowing between the L2 networks, i.e., the L2 networks are not yet merged.

A root bridge change is also initiated. At 720, the VxLAN is notified of the root bridge change request. This can occur by exchanging STP messages (e.g., BDPUs). For example, after giving up its root bridge role, the old root bridge (e.g., switch R2 in FIG. 5A) propagates the root bridge change request to VPN devices (e.g., TOR devices T3, T4 in FIG. 5A) on its L2 network (e.g., the second EVPN multi-homed network 204 in FIG. 5A). The ports (e.g., ports shown by arrow 535 in FIG. 5A) connected to these VPN devices (e.g., TOR devices T3, T4 in FIG. 5A) are also blocked. At 730, the ESI/VLANs with the old root bridge (e.g., switch R2 in FIG. 5A) are brought down, and the VPN devices (e.g., TOR devices T3, T4 in FIG. 5A) give up their respective DF roles (e.g., TOR device T3 active, TOR device T4 standby in FIG. 5A). Additionally, the VPN devices (e.g., TOR devices T3, T4 in FIG. 5A) update the new root bridge (e.g., switch R1 in FIG. 5A). At 740, the VxLAN acknowledges the change of the root bridge. This can occur by exchanging STP messages (e.g., BDPUs). For example, at least one of the VPN devices (e.g., TOR devices T3, T4 in FIG. 5A) can acknowledge the change of root bridge to the old root bridge (e.g., switch R2 in FIG. 5A).

Following acknowledgement of the change of the root bridge at step 740, local STP and VPN modules can begin to complete the site merge. At 750, the ESI/VLANs are brought up with the new root bridge (e.g., switch R1 in FIG. 5A). At 760, the VPN devices (e.g., TOR devices T3, T4 in FIG. 5A) derive new ESI from the new root bridge (e.g., switch R1 in FIG. 5A). The VPN devices (e.g., TOR devices T3, T4 in FIG. 5A) discover all of the TOR devices through ES-Route, which re-initiates the DF election and ensure that only one TOR device is the DF for a given ESI (e.g., only TOR device T1 in FIG. 5A). The ports (e.g., ports shown by arrow 535 in FIG. 5A) connected to these VPN devices (e.g., TOR devices T3, T4 in FIG. 5A) are then unblocked. At 770, STP unblocks the port towards the new root bridge (e.g., port shown by arrow 525 in FIG. 5A). This completes the site merge. With a single-active DF for the given ESI, broadcast loops or broadcast storms will not occur in the merged site. Additionally, hosts can communicate directly within the merged site.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for preventing broadcast looping in a network, comprising:
    detecting a site merge between a plurality of layer 2 (L2) networks using a spanning tree protocol (STP);
    blocking a data traffic port connecting the L2 networks in response to detecting the site merge;
    performing an STP-Ethernet virtual private network (EVPN) handshake, wherein the STP-EVPN handshake comprises:
        notifying a plurality of virtual private network (VPN) devices connected to the merged site of a request to change a root bridge in one of the L2 networks,
        changing the root bridge in the one of the L2 networks, and
        receiving acknowledgement after changing the root bridge in the one of the L2 networks; and
    unblocking the data traffic port connecting the L2 networks, wherein detecting the site merge between the L2 networks using the STP comprises detecting presence of different root bridges for the L2 networks.

2. The method of claim 1, wherein the data traffic port connecting the L2 networks is unblocked after changing the root bridge in the one of the L2 networks.

3. The method of claim 1, wherein the STP-EVPN handshake is performed by exchanging STP messages with the VPN devices connected to the merged site.

4. The method of claim 1, further comprising:
    calculating a new spanning tree for the merged site; and
    selecting a root bridge for the merged site.

5. The method of claim 4, further comprising updating respective root bridges for the VPN devices connected to the merged site to the selected root bridge.

6. The method of claim 5, further comprising:
    bringing down the one of the L2 networks; and
    bringing up the one of the L2 networks with the selected root bridge after changing the root bridge.

7. The method of claim 1, further comprising electing a single-active designated forwarder (DF) from the VPN devices connected to the merged site.

8. The method of claim 7, wherein the single-active DF is elected using border gateway protocol (BGP) network layer reachability information (NLRI).

9. A network device for preventing broadcast looping in a network, comprising:
    a processor and a memory operably coupled to the processor, the memory having computer-executable instructions stored thereon that, when executed by the processor, cause the processor to:
    detect a site merge between a plurality of layer 2 (L2) networks using a spanning tree protocol (STP);
    block a data traffic port connecting the L2 networks in response to detecting the site merge;
    perform an STP-Ethernet virtual private network (EVPN) handshake, wherein the STP-EVPN handshake comprises:
        notifying a plurality of virtual private network (VPN) devices connected to the merged site of a request to change a root bridge in one of the L2 networks,
        changing the root bridge in the one of the L2 networks, and
        receiving acknowledgement after changing the root bridge in the one of the L2 networks; and
    unblock the data traffic port connecting the L2 networks, wherein detecting the site merge between the L2 networks using the STP comprises detecting presence of different root bridges for the L2 networks.

10. The network device of claim 9, wherein the data traffic port connecting the L2 networks is unblocked after changing the root bridge in the one of the L2 networks.

11. The network device of claim 9, wherein the STP-EVPN handshake is performed by exchanging STP messages with the VPN devices connected to the merged site.

12. The network device of claim 9, the memory having further computer-executable instructions stored thereon that, when executed by the processor, cause the processor to:
    calculate a new spanning tree for the merged site; and
    select a root bridge for the merged site.

13. A non-transitory computer-readable recording medium having computer-executable instructions stored thereon for preventing broadcast looping in a network that, when executed by a processor, cause the processor to:
    detect a site merge between a plurality of layer 2 (L2) networks using a spanning tree protocol (STP);
    block a data traffic port connecting the L2 networks in response to detecting the site merge;
    perform an STP-Ethernet virtual private network (EVPN) handshake, wherein the STP-EVPN handshake comprises:
        notifying a plurality of virtual private network (VPN) devices connected to the merged site of a request to change a root bridge in one of the L2 networks,
        changing the root bridge in the one of the L2 networks, and
        receiving acknowledgement after changing the root bridge in the one of the L2 networks; and unblock the data traffic port connecting the L2 networks, wherein detecting the site merge between the L2 networks using the STP comprises detecting presence of different root bridges for the L2 networks.

14. The non-transitory computer-readable recording medium of claim 13, wherein the data traffic port connecting the L2 networks is unblocked after changing the root bridge in the one of the L2 networks.

15. The non-transitory computer-readable recording medium of claim 13, having further computer-executable instructions stored thereon that, when executed by the processor, cause the processor to elect a single-active designated forwarder (DF) from the VPN devices connected to the merged site.

\* \* \* \* \*